(12) United States Patent
Stolz et al.

(10) Patent No.: US 6,498,722 B1
(45) Date of Patent: Dec. 24, 2002

(54) DISK DRIVE ISOLATION MOUNT

(75) Inventors: Howard W. Stolz, Soquel, CA (US); Jay K. Osborn, Alameda, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/426,220

(22) Filed: Oct. 22, 1999

(51) Int. Cl.[7] ................................................. G06F 1/16
(52) U.S. Cl. ...................... 361/685; 361/683; 248/634; 248/638; 360/98.01; 360/137
(58) Field of Search ................................. 361/679–686, 361/724–727; 360/98.01, 97.01, 137, 137 D; 369/75.1–82; 248/618–638

(56) References Cited

U.S. PATENT DOCUMENTS 4,821,368 A   4/1989   Albrecht
5,233,594 A * 8/1993   Wilhelm ..................... 369/75.1
5,644,472 A   7/1997   Klein \* cited by examiner

*Primary Examiner*—Darren Schuberg
*Assistant Examiner*—Lisa Lea-Edmonds
(74) *Attorney, Agent, or Firm*—Eric B. Meyerstons

(57) ABSTRACT

An isolation mounting system attaches a computer component, such as a disk drive, to the structure of a computer system. In an embodiment, the isolation mounting system comprises a post bracket attached to the computer component, a plurality of isolators attached to posts extending from the post bracket, and a socket bracket attached to the isolators and to the structure of the computer system. An opening in the isolators fits over, onto, or around the posts of the post bracket. Outer surfaces of the isolators fit within receptacles of the socket bracket.

26 Claims, 4 Drawing Sheets

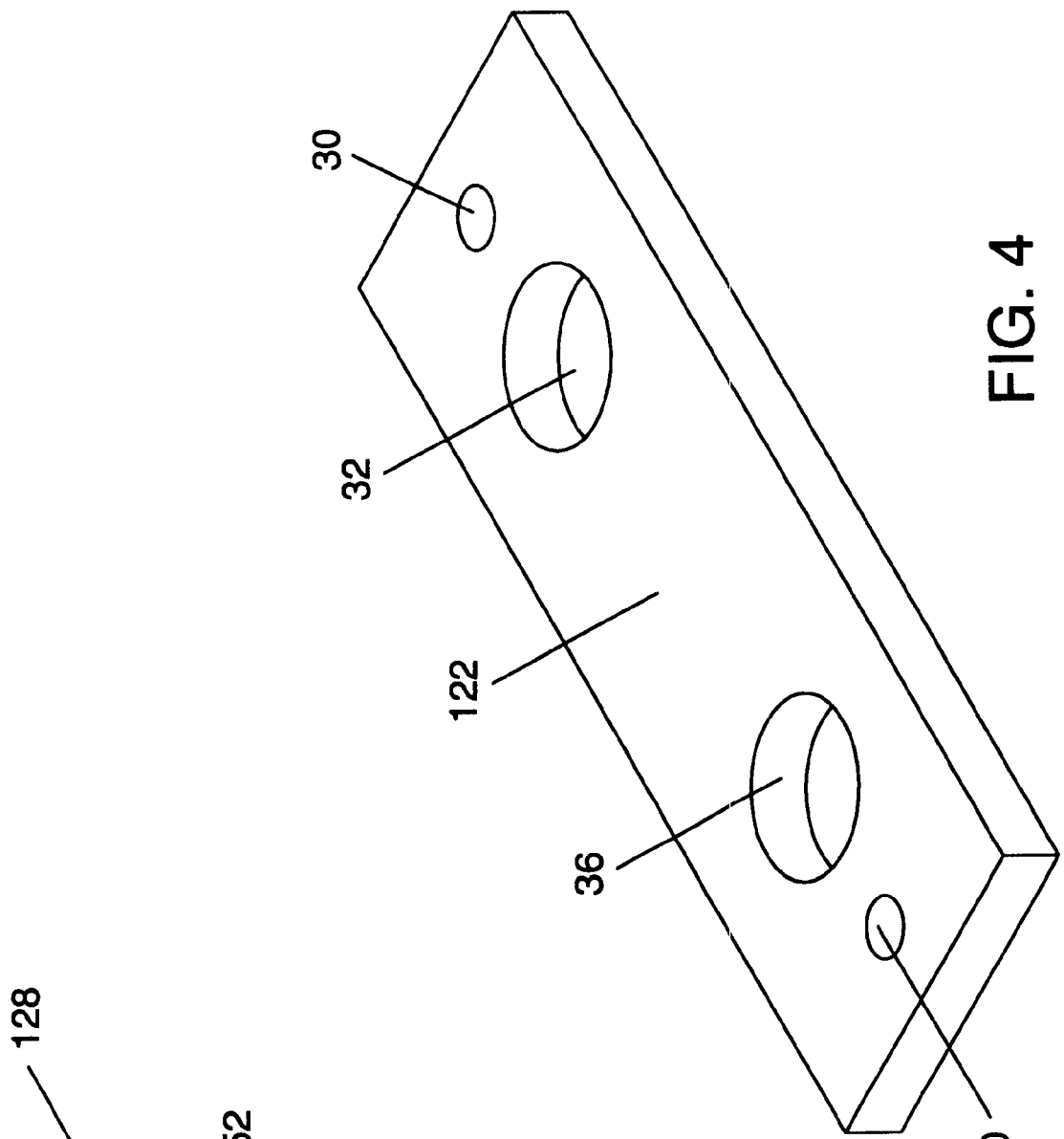
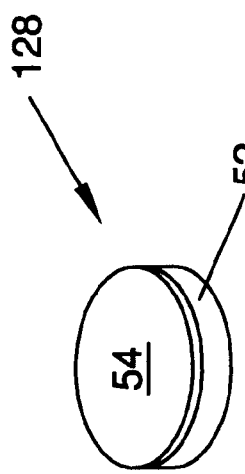
FIG. 4
FIG. 5

DISK DRIVE ISOLATION MOUNT

BACKGROUND OF THE INVENTION

1. Field of the Invention

This invention generally relates to computer component mounting systems, and more particularly to a shock and acoustic isolation mount for a computer component. Computer components include computer disk drives, compact disk players, and other devices that attach to the support structure of a computer system.

2. Description of the Related Art

Computers systems are often subjected to mechanical shock and vibration. Shock and vibration may occur during handling and shipping. Also, shock and vibration may be caused by environmental and user factors. Computer systems in tower enclosures may be subjected to severe shock if the tower topples. Small computers and portable computers are often subjected to severe handling shocks. Vibration may be transmitted to a computer system from the outside environment or vibration may be transmitted internally within the computer system from a computer component.

Some components of a computer system are unaffected by shock and vibration. Other components, such as disk drives, may be damaged or destroyed by shock and vibration. Most disk drives have read/write heads mounted on the ends of lightweight arms. The heads are positioned adjacent to the surface of the disk. Shock or vibration of the disk drive housing may cause a head to contact the surface of the disk. Such contact may cause permanent and irreparable damage to the disk. Less severe shock and vibration to a disk drive over a period of time may cause deficiencies in disk drive performance. The performance deficiencies may include difficulty and slowness of data access. A shock to a computer system may result in the generation of vibration of the exterior of the computer system. The vibration may be transmitted throughout the computer system. Such vibration is often referred to as "shock response ringing."

Many computer components rigidly mount to a support structure within a computer system. When the computer enclosure experiences shock or vibration, the shock or vibration may be transmitted directly to rigidly mounted computer components. Many modern hard drives have threaded mounting holes on opposite lateral sides of the cover. Such hard drives may be rigidly mounted to the computer chassis by screws or other fasteners.

Rigidly mounting a component in a computer system may cause acoustic problems such as structure-borne noise. Structure-borne noise in a computer system typically originates in the mechanical vibration of a component. The vibration typically propagates through solid structures, such as fasteners and the chassis, to the exterior of the computer system. The vibration may energize a large exterior area of the computer system, and the large area may radiate sound in the manner of a sounding or resonating board. Using vibration dampers and isolators between the component and the structure may reduce structure-borne noise caused by the component.

A computer system may be subjected to vibration from an external source or an internal source. If the frequency of the vibration is close to the resonance frequency of structures within the computer system, the vibration energy transmitted throughout the computer system may increase. Such an effect is often referred to as "vibration resonance amplification." Vibration resonance amplification may result in the generation of loud noise from a computer system. Vibration resonance amplification may also damage components within a system. Loud noise and component damage may be caused by coupling vibratory components to the exterior of a computer system even without any resonance effects. Vibration dampers and isolators may change the resonant frequencies of structures within a computer system and damp vibrations transmitted to or from an isolated component.

Systems for isolation mounting a component in a computer system include rubber grommet isolation systems, rigid foam isolation systems, and loose elastomer sheet systems. Rubber grommet isolation systems typically include four molded grommets and a set of custom fasteners. U.S. Pat. No. 4,821,368, issued to Albrecht, and incorporated by reference as if fully set forth herein, describes an eccentric grommet used for mounting a hard disk to a computer system support structure. U.S. Pat. No. 5,644,472, issued to Klein, and incorporated by reference as if fully set forth herein, describes a rigid foam isolation system for a computer system. A component carrier is fabricated from a vibration damping material such as a urethane foam. Cavities in the foam material accommodate components of the computer system. Loose elastomer sheet systems are used in some portable computers. Elastomer sheets trap the hard disk against the computer enclosure.

SUMMARY OF THE INVENTION

The system described herein includes an isolation mount for mounting a computer component, such as a hard disk, to a computer structure. The isolation mount may inhibit external shock and vibration from reaching the component. The isolation mount may also prevent vibration of the component from being transmitted to the computer structure. The system may provide shock isolation, vibration isolation, and acoustic isolation of a component.

In one embodiment, isolators fit over, onto, or around posts mounted on opposite side walls of the computer component housing structure. The posts may be part of a bracket or brackets that fasteners attach to pre-set mounting holes in the side walls of the computer component housing. The isolators fit within sockets attached to the computer structure. The sockets may be part of a bracket or brackets that fasteners attach to the computer structure.

In an alternate embodiment, the isolators fit over, onto, or around posts attached to the computer structure. The posts may be part of a bracket or brackets that fasteners attach to the computer structure. The isolators typically fit within sockets attached to the computer component housing. The sockets may be part of a bracket or brackets that fasteners attach to preset mounting holes or openings in the side walls of the computer component housing.

The support position of the computer component is not limited by the position of pre-set mounting holes within the computer component housing. The posts and sockets on the brackets may be positioned at locations that conform to available space within a computer system enclosure.

The outside surfaces of the isolators may be approximately the same size or slightly larger than the inner surfaces of the sockets into which the isolators fit, thereby forming a frictional fit between the isolators and the sockets when the isolators are positioned within the sockets. The isolators may be formed of a material with high damping characteristics. The material may be a low stiffness, foamed material, such as a urethane foam. The damping characteristics tend to suppress vibration resonance amplification and shock response ringing. The use of low stiffness foamed elastomers as isolators provides a relatively low pre-load force between the computer component and the computer system structure. The relatively low pre-load force and the damping characteristic of the isolators tends to enhance or cause acoustic isolation, which helps to attenuate structure-borne acoustic noise caused by the computer component.

The isolators allow a more full use of available sway space to absorb shock motions. Use of available sway space is desirable in handling drops and system topples. The more full use of available sway space is an improvement over previously used grommets and rigid foam designs which are too rigid to permit large internal motions. The sway space and isolation performance in different directions of motion may be tailored to system need. For example, if the computer system is likely to be subjected to drops, the mounting posts may have extended horizontal surfaces to more effectively inhibit and damp motion caused by vertical forces transmitted to the isolation mounts as a result of the computer system being dropped.

Computer components, such as disk drives, often generate heat during use. For many disk drives, the primary heat transfer surfaces are the top and bottom surfaces of the disk drive. The isolation mount contacts the computer component at relatively small contact areas. Typically, the contact areas are on the sides of the computer component, away from the component's primary heat transfer surfaces. The small contact area is an improvement over the rigid foam and loose-sheet isolation systems. The small contact area allows free flow of air around the computer component for cooling purposes. As such, an additional heat sink for the computer component may not be necessary.

The parts that comprise the isolation mount are typically formed from inexpensive materials. The isolation mount may not require the fabrication of special fasteners. Generally, grommet isolation systems require the fabrication of special fasteners. The isolators of the isolation mount may be fabricated from sheet stock urethane foam. The post brackets and socket brackets may be formed of plastic or sheet metal. The fasteners may be screws, rivets or other attachment means. A resulting isolation mount made from the individual parts is generally sturdy, durable, light weight, simple, efficient, reliable and inexpensive; yet the isolation mount is also easy to manufacture, install, maintain and use.

BRIEF DESCRIPTION OF THE DRAWINGS

FIG. 4 is a perspective view of an alternate embodiment socket bracket; and

FIG. 5 is a perspective view of an alternate embodiment of an isolator.

Figure 1:
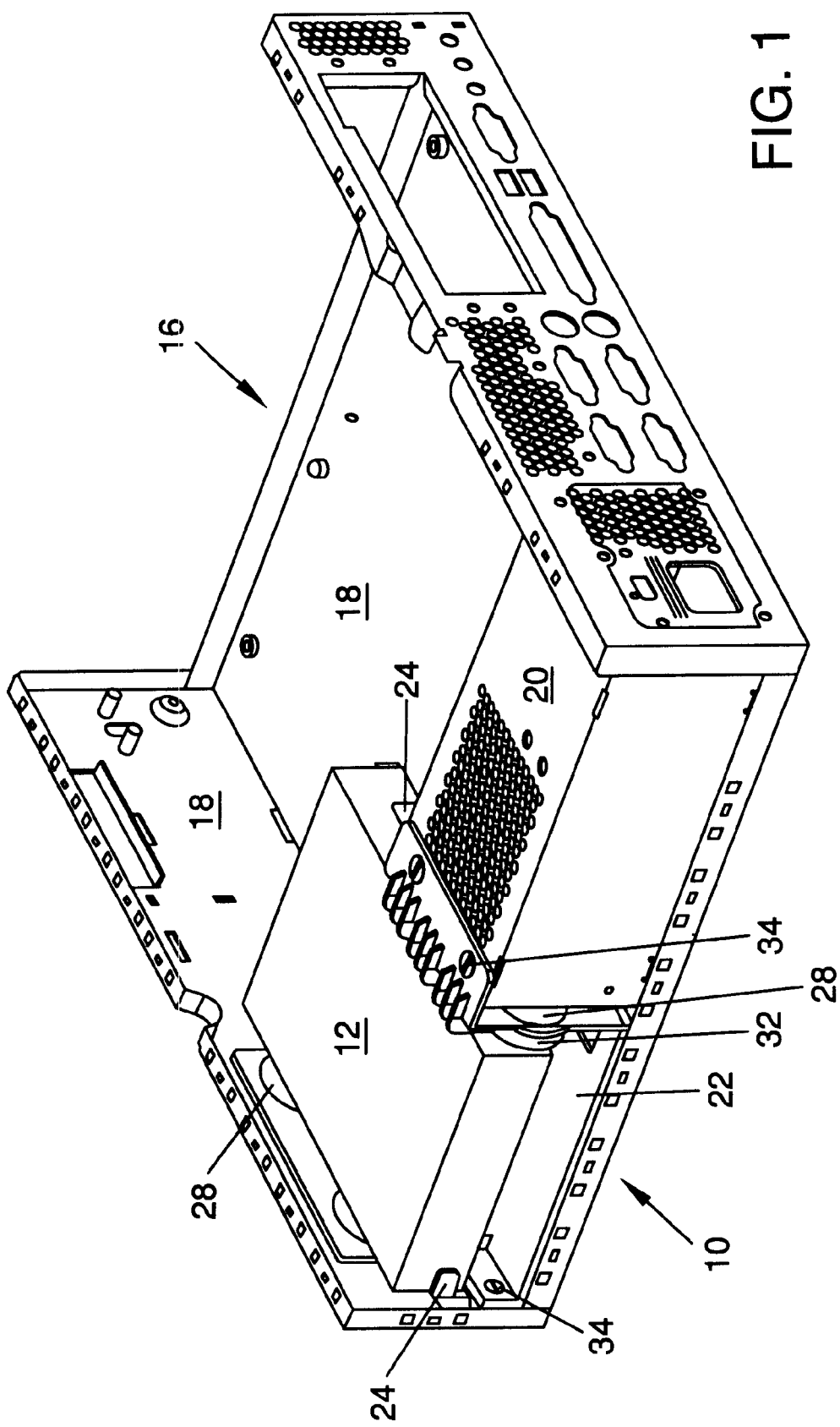
FIG. 1 is a perspective view of an isolation mounting system attached to a support structure of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2:
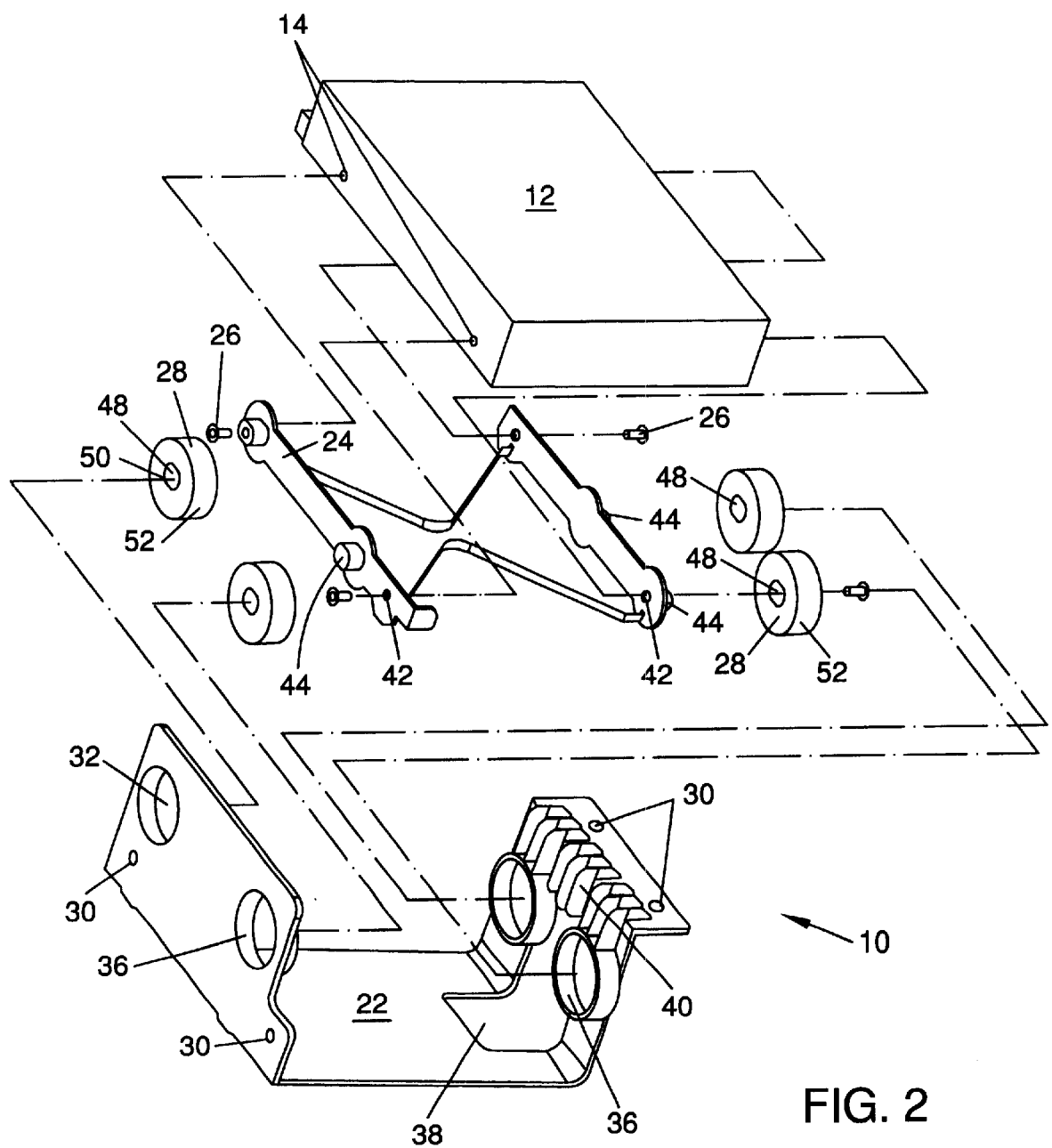
FIG. 2 is an exploded view of an isolation mounting system.

Referring to the drawings, and particularly to FIGS. 1 and 2, one embodiment of an isolation mounting system for shock and vibration isolation of a computer component is designated generally as 10. The computer component may be any type of computer device; including, but not limited to disk drives, CD drives, and backup drives that fasteners attach to the structure of a computer system. For illustrative purposes, the computer component shown and described is disk drive 12. The disk drive 12 may have two pairs of pre-set mounting holes 14 in opposite side walls of the disk drive (only one pair of holes shown). The disk drive 12 may attach to a support structure 16 of a computer system. As shown in FIG. 1, the support structure includes chassis 18 and power supply 20.

FIG. 2 shows an exploded view of an isolation mounting system 10 separated from the support structure (the support structure is not shown in FIG. 2). The isolation mounting system 10 may include socket bracket 22, post bracket 24, fasteners 26, and isolators 28. The socket bracket 22 may include receptacles 32 and optional mounting holes 30. Fasteners 34 (shown in FIG. 1) may be placed through the mounting holes 30 to attach the socket bracket 22 to the support structure 16. The fasteners 34 may be any type of connector that attaches the socket bracket 22 to the support structure; including but not limited to screws, bolts, or rivets. As an alternative, the socket bracket 22 may be welded, glued or attached by other means to the support structure 16. The socket bracket may also be formed as an integral part of the support structure 16.

The socket bracket 22 shown in FIG. 2 has optional wiring slot 38 and optional vents 40. Wires (not shown) from the power supply 20 may pass through the wiring slot 38. The vents 40 may provide a rigid bracket structure. The vents 40 may also allow air flow to pass around the power supply 20 and into space surrounding the isolation mounting system 10.

Each receptacle 32 in the socket bracket 22 has inside surface 36. For illustrative purposes, the receptacles shown in the Figures are cylindrical. It is to be understood that a wide variety of shapes and sizes of receptacles 32 and socket brackets 22 may be used. The cross sectional shape of the receptacles may be circular, elliptical, rectangular, or of a non-regular geometry.

The post bracket 24 may include posts 44, and optional mounting holes 42. The position of the mounting holes 42 on the post bracket 24 may correspond to the pre-set holes 14 on the disk drive 12. Fasteners 26 fasten the post bracket 24 to the disk drive 12. The fasteners 26 may be any type of connector that attaches the post bracket 24 to the disk drive 12; including but not limited to screws, bolts, or rivets. As an alternative, the post bracket 24 may be welded, glued or attached by other means to the disk drive 12. The post bracket 24 may also be formed as an integral part of the disk drive 12.

The posts 44 may be protrusions extending from a surface of the bracket 24. Each post 44 has outside surface 46. The posts 44 may be placed at positions on the post bracket 24 that are not directly in front of the pre-set mounting holes 14 of the disk drive 12. This allows the disk drive 12 to be supported based on the available space within the computer system, not solely on the position of the pre-set mounting holes.

The isolators 28 are supported by the posts 44 of the post bracket 24 and the receptacles 32 of the socket bracket 22.

The isolators 28 may be formed of a low stiffness, high damping elastomeric material, such as a urethane foam. The low stiffness high damping material may help to suppress shock response ringing caused by shocks to the computer system. The high damping material may also help to suppress vibration and vibration resonance amplification caused by external or internal system vibration. The isolators 28 may provide a relatively low pre-load force between the disk drive 12 and the computer support structure 16. The low pre-load force and the damping characteristics of the isolators may enhance acoustic isolation of the disk drive 12. Acoustic isolation of the disk drive 12 inhibits structure-borne acoustic noise caused by the disk drive.

A portion of each isolator 28 may include an opening 48 that forms an inside surface 50. The inside surface 50 may be approximately the same size and shape as the outside surface 46 of a post 44 so that a frictional fit forms between a post and an isolator placed on the post. In an embodiment, the isolators 28 may be glued to the posts 44. Typically, the opening 48 in an isolator 28 is parallel to the outside lateral surface 52 of the isolator.

Outer surface 52 of each isolator 28 may be approximately the same size and shape as the inside surface 36 of a receptacle 32 on the socket bracket 22. A portion of an isolator 28 fits within a receptacle 32. A frictional fit may be formed between a receptacle 32 and an isolator 28 positioned within the receptacle.

When the computer system is subjected to a shock, a force may be transmitted to inner surfaces 36 of the receptacles 32. Such a force would tend to compress the isolators 28 against the posts 44. The elastomeric properties of the isolators damp the magnitude of force transmitted to the posts 44 and to the disk drive 12. The shape of the posts 44, the receptacles 32, and the isolators 28 may be designed to provide sufficient sway space and damping for particular system needs. Sway space is the distance that the isolator 28 compresses due to a force applied to the computer system. For example, if the computer system is likely to be subjected to drops, the horizontal surface area of the posts 44 may be larger than the vertical surface area of the posts so that vertical force applied to the isolation mounting system 10 resulting from a drop is distributed over the large horizontal surface area. If the computer system is likely to topple over, the receptacles 32 may be large and the isolators 28 may be thick so that the force applied to the isolation mounting system 10 resulting from toppling is applied over a large area and through thick isolators. The isolators 28 provide sway space and damping for the disk drive from shock applied to the computer system from any direction.

To assemble an embodiment of the mounting system 10, the socket bracket 22 is attached to the computer support structure 16 by fasteners 34. The post bracket 24 is attached to the disk drive 12 by fasteners 26 positioned through the pre-set mounting holes 14. An isolator opening 48 is placed on each post 44 extending from the post bracket 24. The isolators 28 on a first side of the disk drive 12 are positioned in receptacles 32 located on one side of the socket bracket 22. A compressive force is applied to the isolators 28 on the first side of the disk drive 12 to compress the isolators against the socket bracket 22. Compressing the isolators 28 provides enough room to position the isolators on a second side of the disk drive 12 into the remaining receptacles 32. The isolators 28 on the second side of the disk drive 12 are placed in the remaining receptacles, and the compressive force is removed to allow the disk drive 12 to be supported by the isolators. Only the isolators 28 contact both the support structure 16 and the disk drive 12.

The embodiment of an isolation mounting system 10 described above includes a socket bracket 22 attachable to a computer support structure 16, a post bracket 24 attachable to the disk drive 12, and a plurality of isolators 28 connectable to the socket bracket and to the post bracket. In an alternate embodiment (not shown), the mounting system comprises a socket bracket attachable to the disk drive, a post bracket attachable to the computer structure, and a plurality of isolators connectable to the socket bracket and to the post bracket.

Figure 3:
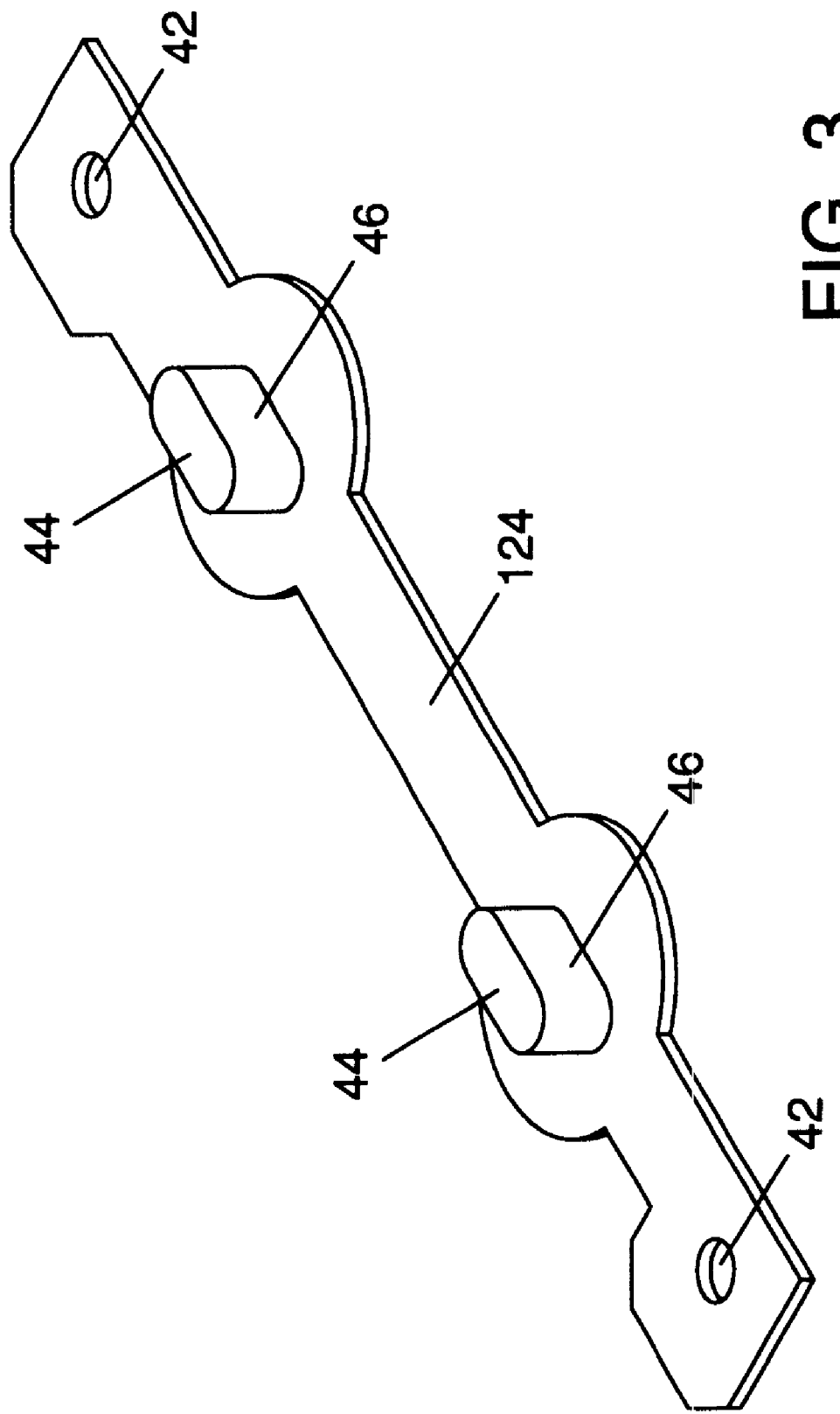
FIG. 3 is a perspective view of an alternate embodiment post bracket.

The post bracket 24, and the socket bracket 22 may not be unitary structures. FIG. 3 shows a post bracket 124 that may be attached to a side of disk drive 12 or to a computer support structure 16. The post bracket 124 may have symmetrically positioned posts 44, so that it does not matter if the bracket is placed on the right or left side of the disk drive 12. Post brackets that do not have symmetrically positioned posts 44 may be formed to meet specific system spacing requirements. FIG. 4 shows a socket bracket 122 that may be attached to a side of a disk drive 12 or to a computer support structure 16. The bracket may have symmetrically placed receptacles 32, so that it does not matter if the bracket is placed on the right or left side of the disk drive 12. Socket brackets that do not have symmetrically positioned receptacles 32 may be formed to meet specific system spacing requirements.

FIG. 5 shows an alternate embodiment of an isolator 128. The isolator 128 has plate 54 which covers one side of the opening 48 (the opening not shown in FIG. 5). The plate 54 may be a layer of low stiffness, high damping foamed material, such as a urethane foam. The plate 54 may provide additional isolator contact area.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An isolation mounting system for attaching a computer component to a support structure of a computer system, comprising:

a first protrusion extending from a first side of the computer component;

a second protrusion extending from a second side of the computer component;

a first isolator having an opening and an outer surface, the opening of the first isolator configured to be coupled to the first protrusion during use;

a second isolator having an opening and an outer surface, the opening of the second isolator configured to be coupled to the second protrusion during use;

a first receptacle on the support structure in working relation to the first protrusion, the first receptacle configured to couple to a portion of the outer surface of the first isolator during use, and wherein a frictional fit couples the first isolator to the first receptacle; and a second receptacle on the support structure in working relation to the second protrusion, the second receptacle configured to couple to a portion of the outer surface of the second isolator during use, and wherein a frictional fit couples the second isolator to the second receptacle;

wherein the first isolator and the second isolator provide sway space and damping in any direction for the computer component during use.

2. The isolation mounting system as defined in claim 1, wherein the computer component is a disk drive.

3. The isolation mounting system as defined in claim 1, wherein the first and second isolators comprise an elastomeric material.

4. The isolation mounting system as defined in claim 3, wherein the elastomeric material comprises a urethane foam.

5. The isolation mounting system as defined in claim 1, wherein the second protrusion extends from a side of the computer component substantially opposite the first side of the computer component.

6. The isolation mounting system as defined in claim 1, further comprising a bracket coupled to the computer component, wherein the first protrusion extends from a surface of the bracket.

7. The isolation mount system as defined in claim 1, further comprising a bracket coupled to the computer structure, wherein the first receptacle is formed in at least a portion of the bracket.

8. The isolation mount system as defined in claim 1, wherein the isolators substantially reduce vibration resonance amplification and shock response ringing.

9. An isolation mount system for attaching a computer component to a support structure of a computer system, comprising:

a first protrusion extending from the support structure;

a second protrusion extending from the support structure;

a first isolator having an opening and an outer surface, the opening of the first isolator configured to be coupled to the first protrusion during use;

a second isolator having an opening and an outer surface, the opening of the second isolator configured to be coupled to the second protrusion during use;

a first receptacle on a first side of the computer component in working relation to the first protrusion, the first receptacle configured to couple to a portion of the outer surface of the first isolator during use, wherein the outer surface of the first isolator is approximately the same size and shape as an inside surface of the first receptacle, and wherein a frictional fit couples the first isolator to the first receptacle; and a second receptacle on a second side of the computer component in working relation to the second protrusion, the second receptacle configured to couple to a portion of the outer surface of the second isolator during use, wherein the outer surface of the second isolator is approximately the same size and shape as an inside surface of the second receptacle, and wherein a frictional fit couples the second isolator to the second receptacle.

10. The isolation mounting system as defined in claim 9, wherein the computer component is a disk drive.

11. The isolation mounting system as defined in claim 9, wherein the first and second isolators comprise an elastomeric material.

12. The isolation mounting system as defined in claim 11, wherein the elastomeric material comprises a urethane foam.

13. The isolation mounting system as defined in claim 9, wherein the second receptacle is on a side of the computer component substantially opposite the first side of the computer component.

14. The isolation mounting system as defined in claim 9, further comprising a bracket coupled to the support structure, wherein the first protrusion extends from a surface of the bracket.

15. The isolation mount system as defined in claim 9, further comprising a bracket coupled to the computer component, wherein the first receptacle is formed in at least a portion of the bracket.

16. The isolation mount system as defined in claim 9, wherein the isolators substantially reduce vibration resonance amplification and shock response ringing.

17. An isolation mount system for attaching a computer component to a support structure of a computer system, comprising:

a first protrusion extending from the support structure;

a second protrusion extending from the computer component;

a first isolator having an opening and an outer surface, the opening of the first isolator configured to be coupled to the first protrusion during use;

a second isolator having an opening and an outer surface, the opening of the second isolator configured to be coupled to the second protrusion during use;

a first receptacle on a side of the computer component in working relation to the first protrusion, the first receptacle configured to couple to a portion of the outer surface of the first isolator during use, and wherein a frictional fit couples the first isolator to the first receptacle; and a second receptacle on the support structure in working relation to the second protrusion, the second receptacle configured to couple to a portion of the outer surface of the second isolator during use, and wherein a frictional fit couples the second isolator to the second receptacle;

wherein the first isolator and the second isolator provide sway space and damping in any direction for the computer component during use.

18. The isolation mounting system as defined in claim 17, wherein the computer component is a disk drive.

19. The isolation mounting system as defined in claim 17, wherein the first and second isolators comprise an elastomeric material.

20. The isolation mounting system as defined in claim 19, wherein the elastomeric material comprises a urethane foam.

21. The isolation mounting system as defined in claim 17, wherein the second receptacle is on a side of the computer component opposite the first side of the computer component.

22. The isolation mounting system as defined in claim 17, further comprising a bracket coupled to the support structure, wherein the first protrusion extends from a surface of the bracket.

23. The isolation mounting system as defined in claim 17, further comprising a bracket coupled to the computer component, wherein the first receptacle is formed in at least a portion of the bracket.

24. The isolation mount system as defined in claim 17, wherein the isolators substantially reduce vibration resonance amplification and shock response ringing.

25. A method of isolating a computer component from shock and vibration, comprising:

attaching a plurality of isolators to support structure on a computer component, wherein a frictional fit couples the isolators to the support structure;

attaching the plurality of isolators to a computer structure so that the isolators support the computer component, wherein a frictional fit couples the isolators to the computer structure; and wherein only the isolators contact both the support structure on the computer component and the computer structure and wherein the isolators are configured to provide a sway space and damping in any direction for the computer component when the computer structure is subjected to shock.

26. The method as defined in claim 25, wherein each isolator comprises a urethane foam.

\* \* \* \* \*